(12) United States Patent
Nikolaev et al.

(10) Patent No.: US 10,027,562 B2
(45) Date of Patent: Jul. 17, 2018

(54) DETECTING NETWORK SERVICES BASED ON NETWORK FLOW DATA

(71) Applicant: Cisco Technology, Inc., San Jose, CA (US)

(72) Inventors: Ivan Nikolaev, Prague (CZ); Martin Grill, Prague (CZ); Jan Jusko, Prague (CZ)

(73) Assignee: CISCO TECHNOLOGY, INC., San Jose, CA (US)

( * ) Notice: Subject to any disclaimer, the term of this patent is extended or adjusted under 35 U.S.C. 154(b) by 558 days.

(21) Appl. No.: 14/485,644

(22) Filed: Sep. 12, 2014

(65) Prior Publication Data

US 2016/0080236 A1    Mar. 17, 2016

(51) Int. Cl.
G06F 15/173 (2006.01)
H04L 12/26 (2006.01)
H04L 29/06 (2006.01)

(52) U.S. Cl.
CPC ............ *H04L 43/026* (2013.01); *H04L 63/14* (2013.01)

(58) Field of Classification Search
CPC .............................. H04L 43/026; H04L 63/14
USPC .................................................. 709/223, 224
See application file for complete search history.

(56) References Cited

U.S. PATENT DOCUMENTS

| | | | | |
|---|---|---|---|---|
| 6,046,980 A * | 4/2000 | Packer | ................ | H04L 41/0213 370/229 |
| 6,141,686 A * | 10/2000 | Jackowski | ............ | H04L 41/065 709/206 |
| 6,681,232 B1 * | 1/2004 | Sistanizadeh | ....... | H04L 12/2602 |
| 7,207,063 B1 * | 4/2007 | Fluhrer | ............... | H04L 63/0272 709/217 |
| 8,856,869 B1 * | 10/2014 | Brinskelle | ............... | H04L 63/08 726/12 |
| 8,984,110 B1 * | 3/2015 | Asveren | .................. | H04L 45/08 709/220 |

(Continued)

OTHER PUBLICATIONS

Crotti et al., "A statistical approach to IP-level classification of network traffic", 2006, IEEE ICC 2006 proceedings, pp. 170-176.*

(Continued)

*Primary Examiner* — Davoud Zand
(74) *Attorney, Agent, or Firm* — Hickman Palermo Becker Bingham LLP

(57) ABSTRACT

Detecting network services based on network flow data is disclosed. Using a networking device, network flow data is obtained for a plurality of endpoints of a telecommunications network. Each endpoint of the plurality of endpoints is uniquely described by data comprising an IP address, a port, and a communication protocol. For each endpoint of a set of at least one endpoint selected from the plurality of endpoints, a plurality of peers of the endpoint is determined by detecting communication between the endpoint and the plurality of peers based on the network flow data. For each peer of a set of peers selected from the plurality of peers, a difference between a number of peers of the endpoint and a number of peers of said each peer is determined based on the network flow data. It is determined if the endpoint is a service based on the difference determined for each peer of the set of peers. Network management is performed based on the determination of whether the endpoint is a service.

17 Claims, 7 Drawing Sheets

(56) References Cited

U.S. PATENT DOCUMENTS

| | | | | |
|---|---|---|---|---|
| 2007/0064608 A1* | 3/2007 | Rinne | ................ | H04L 41/0806 |
| | | | | 370/230 |
| 2010/0217837 A1* | 8/2010 | Ansari | ................ | G06Q 30/04 |
| | | | | 709/218 |
| 2013/0117434 A1* | 5/2013 | Chakrabarti | ............ | H04L 45/70 |
| | | | | 709/224 |
| 2013/0117847 A1* | 5/2013 | Friedman | ............ | H04L 63/1425 |
| | | | | 726/22 |
| 2013/0304892 A1* | 11/2013 | Afergan | ................ | H04L 69/16 |
| | | | | 709/223 |
| 2014/0157405 A1* | 6/2014 | Joll | .................... | H04L 63/1425 |
| | | | | 726/22 |

OTHER PUBLICATIONS

Vaarandi, Risto, "Detecting Anomalous Network Traffic in Organization Private Networks", IEEE CogSIMA, dated 2013, 9 pages.

Berthier et al., "Nfsight: NetFlow-based Network Awareness Tool", dated Aug. 10, 2010, 16 pages.

\* cited by examiner

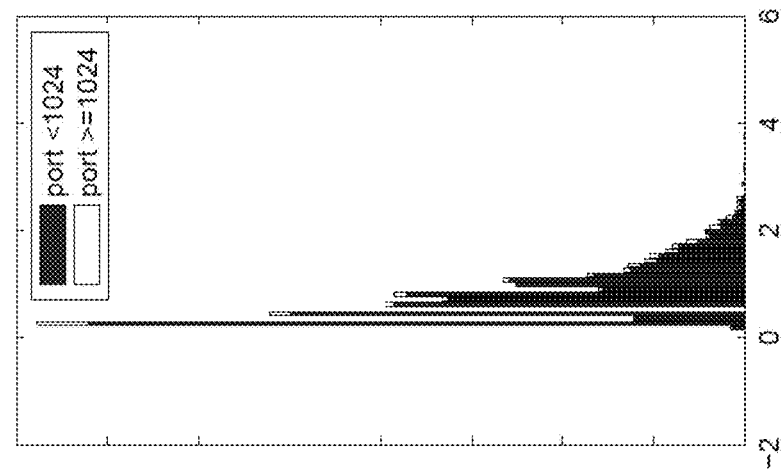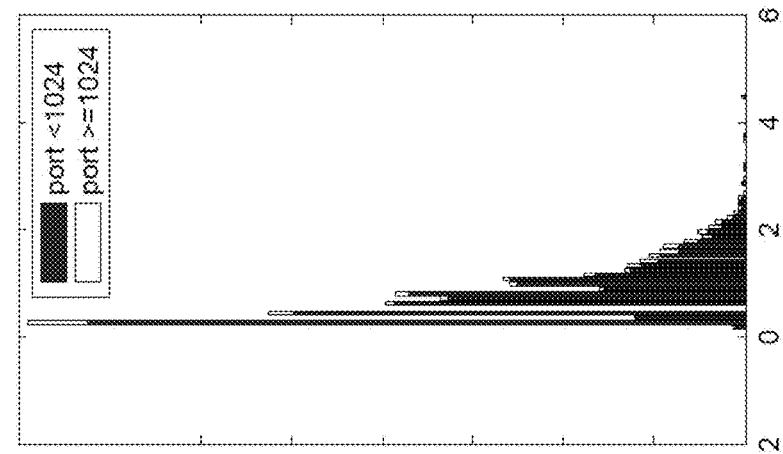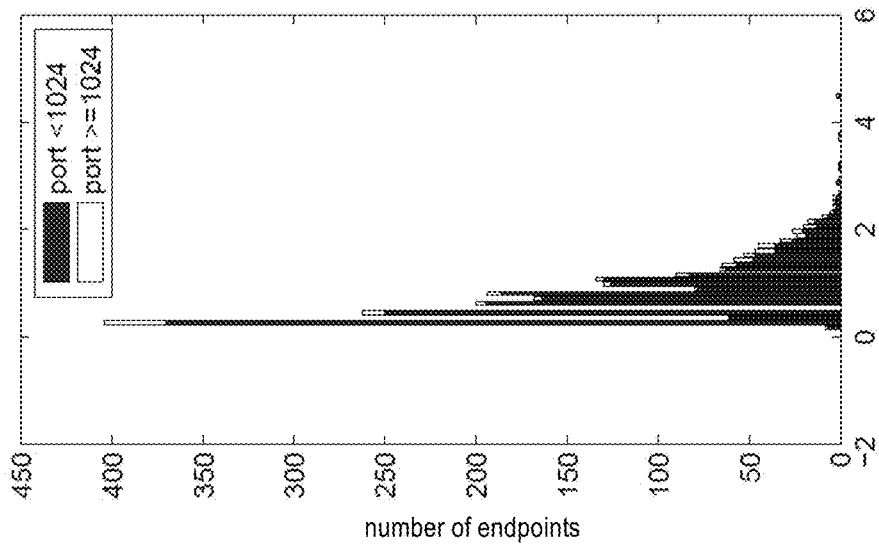

DETECTING NETWORK SERVICES BASED ON NETWORK FLOW DATA

TECHNICAL FIELD

The present disclosure generally relates to computer-implemented network analysis techniques. The disclosure relates more specifically to improved computers and improved computer-implemented techniques for detecting available network services based on obtaining and analyzing network flow data.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A wide variety of network services are commonly used in both enterprise and private computer network environments. However, network administrators often have difficulty tracking which services are active on a network, including whether the services violate administration policies or introduce security issues. For example, malicious services may run on one or more computing devices without the knowledge of a user. Different services produce different types of traffic and a large variety of different data, further complicating service detection.

One method of keeping updated records of the services running in a network is to prevent the installation of software on each network node by non-administrator users. However, this method may be unduly restrictive and may not be entirely possible. Another method for detecting services is to perform deep packet inspection on all network traffic. However, deep packet inspection may be considered an invasion of privacy, and may not work for encrypted data. Furthermore, deep packet inspection is computationally expensive due to the need to inspect each packet, leading to a lack of scalability as the network grows or as network traffic increases.

BRIEF DESCRIPTION OF THE DRAWINGS

In the drawings:

FIG. 7A, FIG. 7B, FIG. 7C illustrate data regarding a plurality of endpoints classified as service endpoints in an example network at various intermediate stages.

DESCRIPTION OF EXAMPLE EMBODIMENTS

Figure 1:
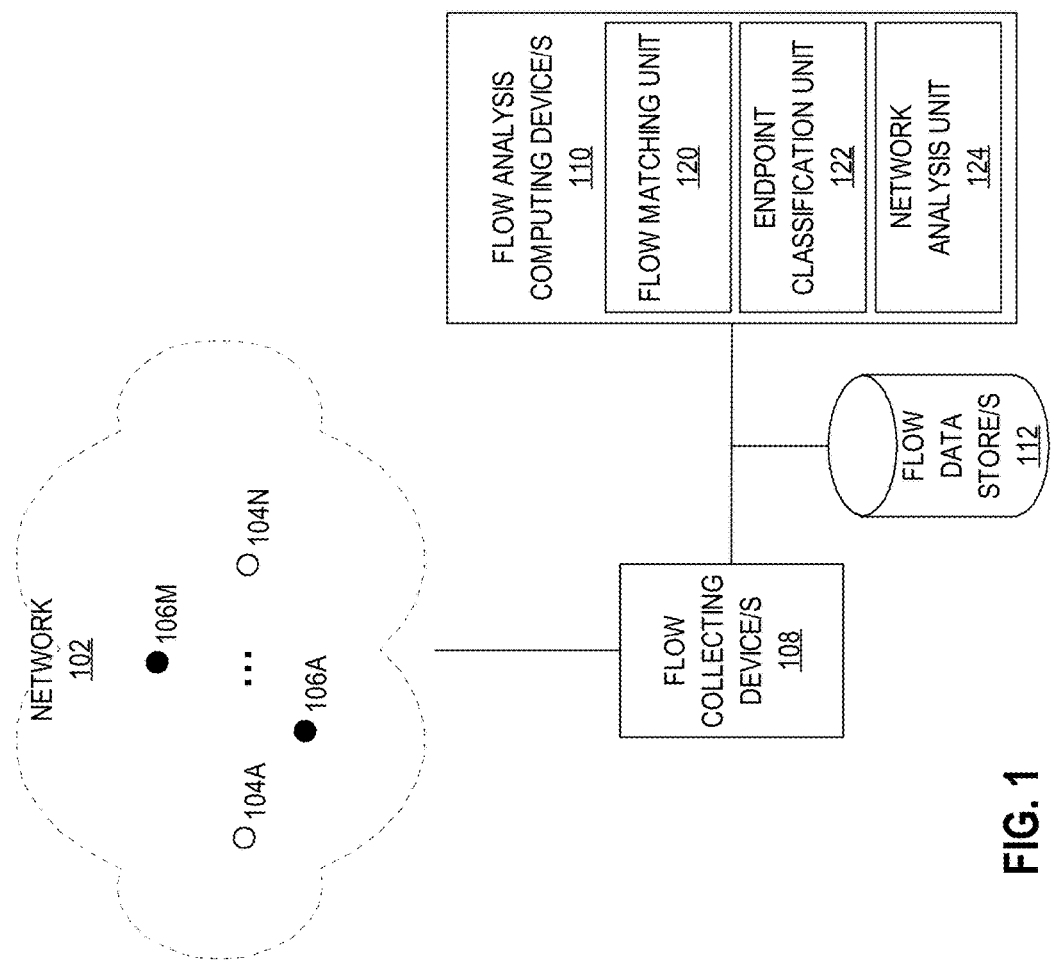
FIG. 1 illustrates an example network arrangement in which embodiments may be used.

Improved computers and computer-implemented techniques for detecting network services based on network flow data are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. Overview

For the purpose of describing clear examples, in this disclosure, "network flow" refers to a set of one or more related packets that are transmitted from a source address to a destination address. In various embodiments, network flow data may be obtained from networking devices such as routers and switches that host network flow management services such as, but not limited to, NetFlow™ or Internet Protocol Flow Information Export (IPFIX). NetFlow™ is commercially available as part of IOS Software from Cisco Systems, Inc., San Jose, Calif. In one embodiment, network flow data comprises one or more individual network flow records that may each represent a set of packets sharing a source IP address, a destination IP address, an IP protocol, a source port (for UDP or TCP), a destination port (for UDP or TCP), and IP type of service.

One embodiment is directed to an improved computer-implemented method for detecting network services that has numerous improvements to computer operation, efficiency and organization as compared to any possibly related past practice. Using a networking device, network flow data is obtained for a plurality of endpoints of a telecommunications network. Each endpoint of the plurality of endpoints is uniquely described by data comprising an IP address, a port, and a communication protocol. For each endpoint of a set of at least one endpoint selected from the plurality of endpoints of a telecommunication network, a plurality of peers of the endpoint is determined by detecting communication between the endpoint and the plurality of peers based on the network flow data. The plurality of peers of a particular endpoint includes a set of endpoints that the endpoint communicated with, according to the network flow data. For each peer of a set of peers selected from the plurality of peers, a difference between a number of peers of the endpoint and a number of peers of said each peer is determined based on the network flow data. It is determined if the endpoint is a service based on the difference determined for each peer of the set of peers. Network management is performed based on the determination of whether the endpoint is a service.

In one embodiment, peers are determined by matching pairs of network flows based on source IP address values, destination IP address values, IP protocol values, source port values, and destination port values. The matching of pairs of network flows may be performed in parallel.

In one embodiment, determining if the endpoint is a service further includes determining a median peer difference of the endpoint, where the median peer difference is a median of differences, for each peer of the set of peers, between a number of peers of the endpoint and a number of peers of said each peer. For example, the endpoint may be classified as a service when the median peer difference is above a threshold. The use of a peer difference threshold is based on the observation that a service is likely to have a high number of peers, whereas the user is likely to have only few peers.

Endpoints initially capable of classification as a service may be filtered out, and thus not classified as a service, based on a determination that the endpoint corresponds to a scan from a fixed port. The determination that the endpoint corresponds to a scan from a fixed port is based on the network flow data. Alternatively and/or in addition, endpoints initially classifiable as a service may be filtered out based on a determination that the endpoint corresponds to peer-to-peer traffic. The determination that the endpoint corresponds to peer-to-peer traffic is based on the network flow data.

Another embodiment is directed to a method for detecting network services. Pair data is generated. The pair data includes matching pairs of network flows in a network. For each endpoint of a set of endpoints selected from a plurality of endpoints of the network, a plurality of peers of the endpoint is determined based on the pair data. A difference metric of the endpoint, such as a median peer difference, is determined based on the pair data. The difference metric of an endpoint is based on differences, for each peer of a set of the plurality of peers, between the number of peers of the endpoint and the number of peers of each peer. In one embodiment, the difference metric is a median peer difference. A set of service endpoints are determined based on the difference metric of each endpoint in the set of endpoints. Zero or more endpoints determined to correspond to a scan from a fixed port are filtered from the set of service endpoints. Zero or more endpoints determined to correspond to peer-to-peer traffic are filtered from the set of endpoints.

2. Structural and Functional Examples

FIG. 1 illustrates an example network arrangement in which embodiments may be used. The networking arrangement of FIG. 1 comprises a plurality of computing host devices 104A, 104N in a network 102. Host computing devices 104A, 104N may include one or more computing devices configured to receive instructions directly from a user such as a personal computer, a workstation, a mobile computing device. The reference numerals 104A, 104N denote two computing devices for purposes of illustrating a clear example, but in other embodiments, any number of computing devices may be used.

Host computing devices 104A-N are coupled by one or more networking devices 106A, 106M, such as one or more routers, switches, or other network devices comprising routing and switching logic. In one embodiment, one or more networking devices 106A, 106M of network 102 are network flow-enabled. As used herein with respect to a networking device, the term "network flow-enabled" refers the capability of generating network flow data by the networking device. Network flow data includes one or more network flow records that describe a flow of communication in a network. In one embodiment, network flow records are unidirectional; therefore a bi-directional communication between two endpoints would include two network flows. Network flow data shall be described in greater detail below with respect to FIG. 2. In one embodiment, the network-flow feature of a network-flow enabled networking device 106A, 106M may be active or inactive. Although one or more networking devices 106A, 106M of network 102 may be network flow-enabled, it is not always necessary to activate this feature on each network flow-enabled networking device 106A, 106M. Reference numerals 106A, 106M denote two internetworking devices for purposes of illustrating a clear example, but in other embodiments there may be any number of such devices in network 102.

When the network flow feature is active on a network flow-enabled networking device 106A, the active network-flow enabled networking device will collect, or generate network flow records for one or more packets that traverse the active network-flow enabled networking device. Because one network flow record can represent thousands of packets sent from an endpoint to another endpoint, the volume of data exported is relatively low and is scalable even when the volume of traffic increases.

The active network-flow enabled networking device 106A is further configured to export the locally collected network flow data to one or more flow collecting device/s 108. The term "device/s 108" is used to indicate that any number of flow collecting devices may be present in the system; for purposes of illustrating a clear example, a single device 108 is shown in FIG. 1. Network flow-enabled networking device 106A may be configured to export the network flow data to a specific flow collecting device 108, or may dynamically determine the correct flow collecting device to which to send the network flow data generated at the particular networking device. In one embodiment, network flow-enabled networking device 106A periodically exports network flow data. Alternatively and/or in addition, network flow records are exported when it is determined that the corresponding communication is finished. In one embodiment network flow data is exported using User Datagram Protocol (UDP) directed to network flow collector device 108. In one embodiment, network flow-enabled networking device 106A is configured with the IP address in the destination UDP port of the network flow collecting device 108.

In one embodiment, network 102 is a legacy network comprising networking devices that generally are not network flow-enabled, such as one or more legacy switches and/or router. In this case, one or more network flow-enabled probes may be inserted into network 102 to intercept communications between host computing device 104A, 104N, thereby enabling the network probes to generate and export network flow data that is usable in accordance with the embodiments described herein. For the embodiments described herein, a network flow-enabled probe may be considered a network flow-enabled networking device 106.

Flow collecting device/s 108 may be configured to store network flow data in one or more flow data stores 112. Alternatively and/or in addition, flow collecting device/s 108 may provide the network flow data to one or more flow analysis computing device/s 110. Likewise, flow analysis computing device/s 110 may obtain network flow data for analysis directly from a one or more flow collecting devices 108 and/or from one or more flow data stores 112.

In FIG. 1, flow collecting device/s 108, flow data store/s 112 and flow analysis computing device/s 110 are shown outside of network 102. However, one or more of these elements may be a component of network 102.

Flow analysis computing device 110 is configured to detect network services based on network flow data. In one embodiment, flow analysis computing device 110 is one of host computing devices 104A, 104N. In an embodiment, flow analysis computing device 110 includes flow matching unit 120, endpoint classification unit 122, and network analysis unit 124. Although flow matching unit 120, endpoint classification unit 122, and network analysis unit 124 are shown as distinct units of a flow analysis computing device 110, one or more units shown may be implemented as one or more combined units. Furthermore, one or more units shown may be implemented on one or more other devices. Additionally, one or more units shown may be implemented as a distributed unit on multiple devices.

Flow matching unit 120 is configured to match unidirectional network flows to determine two or more endpoints in network 120 that are in communication with each other. In one embodiment, flow matching unit 120 is configured to match endpoints that are peers based on the network flow data, where each endpoint is uniquely described by an IP address, a port, and a communication protocol, and where each network flow record describes communication between a first endpoint and a second endpoint. As used herein, a "peer" of a particular endpoint refers to another endpoint that is observed to communicate bi-directionally with the particular endpoint; the particular endpoint and the other endpoint are "peers." The bi-directional communication is detected by flow matching unit 120 based on the network flow data.

Although flow matching unit 120 is shown as a unit of a particular flow analysis computing device 110 in FIG. 1, flow matching unit 120 may comprise a plurality of flow matching units 120 across network 120 that are configured to match network flow records in parallel or in another distributed manner.

Endpoint classification unit 122 is configured to classify the one or more entities in network 102 by analyzing the corresponding network flow data. In one embodiment, endpoint classification unit 122 is configured to analyze network flow data corresponding to an endpoint and determine whether the endpoint is a service. In one embodiment, endpoint classification unit 122 is configured to classify an endpoint based on a difference metric determined for the endpoint, such as a median peer difference. A difference metric of an endpoint is based on differences, for each peer of a set of the plurality of peers, between the number of peers of the endpoint and the number of peers of each peer. A median peer difference is a median of differences between a number of peers of the unprocessed endpoint of a number of peers of each of the set of peers of the unprocessed endpoint. Equation (1) is a formula for the median peer difference, where:

$d_e$ is the median peer difference for endpoint e;
$|P_e|$ refers to the number of peers of endpoint e;
$P_e$ refers to the set of peers of endpoint e;
$P_i$ refers to the set of peers of endpoint i;
$|P_i|$ refers to the number of peers of endpoint i;
i is a peer from a set of peers $P_e$;

$$d_e = \text{median } \{|P_e| - |P_i|\}_{i \in P_e} \quad (1)$$

In one embodiment, endpoint classification unit 122 is configured to classify a plurality of endpoints. For example, the plurality of endpoints may include all or substantially all the endpoints observed in a set of network flow data for a given period, or all the endpoints matched with one or more peers in the set of network flow data (e.g. by flow matching unit 120).

After determining the median peer difference or other difference metric for the plurality of endpoints, a preliminary set of service endpoints may be determined; that is, the set of endpoints are classified as either a service or not a service. In one embodiment, a particular endpoint is classified as a service when the median peer difference is greater than, or greater than or equal to, a threshold. In one embodiment, the threshold value used to classify the particular endpoint as a service is zero.

Endpoint classification unit 122 may be further configured to filter one or more endpoints from the preliminary set of service endpoints. In one embodiment, zero or more endpoints may be filtered or otherwise removed if they are determined to correspond to a scan from a fixed port. An endpoint may be determined to correspond to a scan from a fixed port when a large number of unsuccessful connections originate from the endpoint. In one embodiment, zero or more endpoints may be filtered or otherwise removed if they are determined to correspond to peer-to-peer traffic. An endpoint may be determined to correspond to peer-to-peer traffic when a one or more hosts are contacted from a port greater than or equal to 1024 for communication using both TCP and UDP protocols. For example, if the network flow data shows that a host 1.1.1.1 communicates on a port 2222 with other hosts using both TCP and UDP protocols, the endpoints identified by <host=1.1.1.1, port=2222, protocol=TCP> and <host=1.1.1.1, port=2222, protocol=UDP> are all filtered out.

Network analysis unit 124 is configured to perform one or more analysis functions based on the classification of the endpoints, such as the classification of one or more endpoints as performed by endpoint classification unit 122. In one embodiment, network analysis unit 124 is configured to further analyze the network based on the network services detected by endpoint classification unit 122. For example, network analysis unit 124 may be configured to monitor that one or more expected services are running and functioning normally. Network analysis unit 124 may also be configured to analyze, report on, or learn about network traffic, such as by recording or observing changes over time. Network analysis unit 124 may also be configured to recognize services and/or other network usage that deviates from normal network behavior, including the detection of unauthorized or malicious behavior. In one embodiment, network analysis unit 124 provides information to a network intrusion detection systems that uses the service detection data and other additional information, to model the users and services in more detail. An example of network analysis unit 124 is described in application Ser. No. 14/448,637, filed Jul. 31, 2014, the entire contents of which is hereby incorporated by reference for all purposes as if fully set forth herein.

Figure 2:
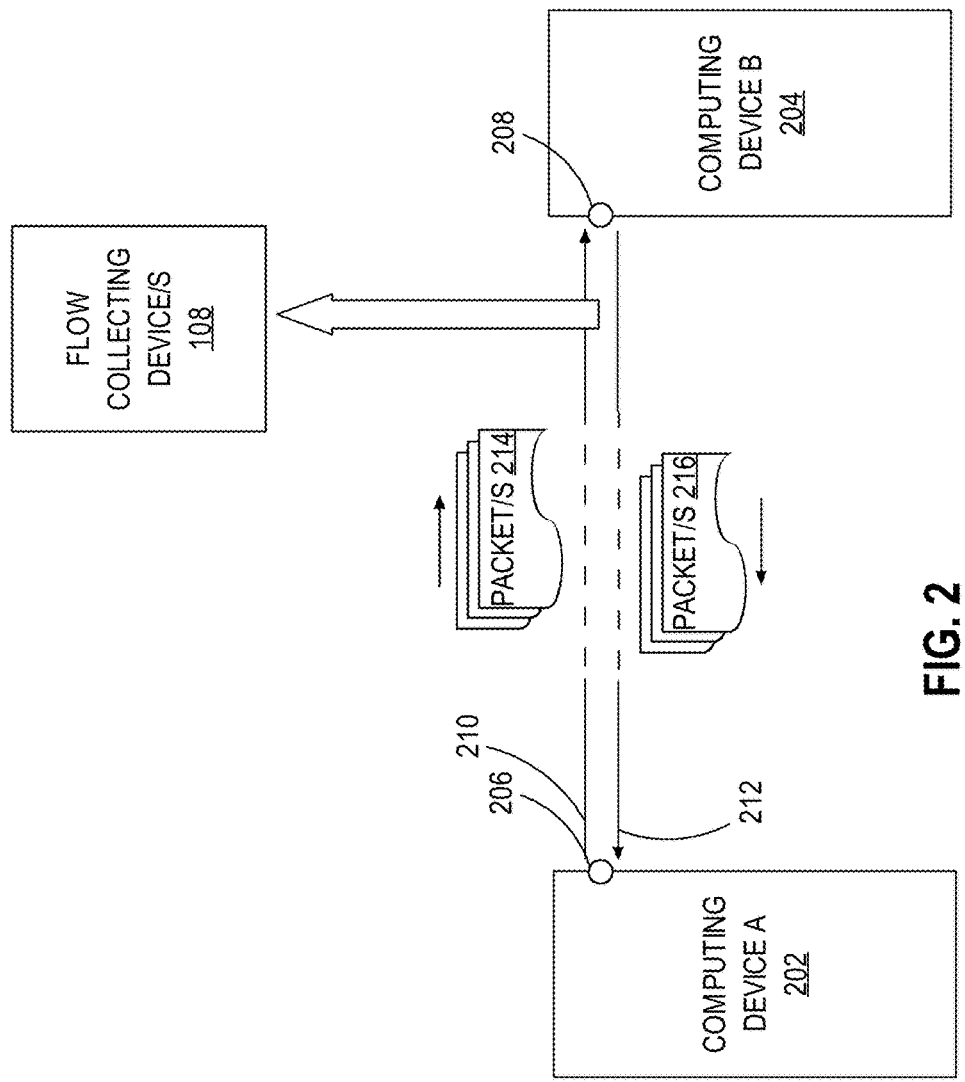
FIG. 2 illustrates an embodiment of a pair of endpoints observed to communicate.

FIG. 2 illustrates an embodiment of a pair of endpoints that are observed to communicate by another unit, such as flow analysis computing device/s 110. In this context, "observed to communicate" means that two matching network flow records are detected, each indicating a unidirectional network flow. For example, the matching network flow records may be detected in network flow data collected by a unit, such as one or more flow collecting device/s 108.

Endpoint 206 is an endpoint of computing device 202. Endpoint 208 is an endpoint of computing device 204. Each endpoint may be defined by a unique triple comprising an IP address, a port, and a communication protocol. Endpoints 206 and 208 are peers, as reflected by the bi-directional communication. Network flow 210 represents a plurality of unidirectional packets 214 sent from endpoint 206 to endpoint 208. Network flow 212 represents a plurality of unidirectional packets 216 sent from endpoint 208 to endpoint 206.

When one or more packets 212 is sent from a first endpoint 206 to a second endpoint 208 over a path that includes one or more network flow-enabled networking devices 106 where the network flow feature is active, an active network flow-enabled networking device will generate a first network flow record corresponding to the packet/s. The response from the second endpoint 208 to the first endpoint 206 will generate a second network flow record that is distinct from the first network flow record. Even though thousands of packets may be transferred from the first host to the second host, only two network flow records are necessary to represent the communications since the tuple of values that defines the flow is shared among and present in all the packets. The packets 212, 216 may travel over one or more different paths, potentially causing different network-flow enabled devices to generate a network flow record that represents the same network flows 210, 212. When the different network-flow enabled device export the network flow data, duplicate network flow data may be aggregated or otherwise processed to detect and handle duplicate network flow records.

3. Example Processes for Detecting Network Services

Figure 3:
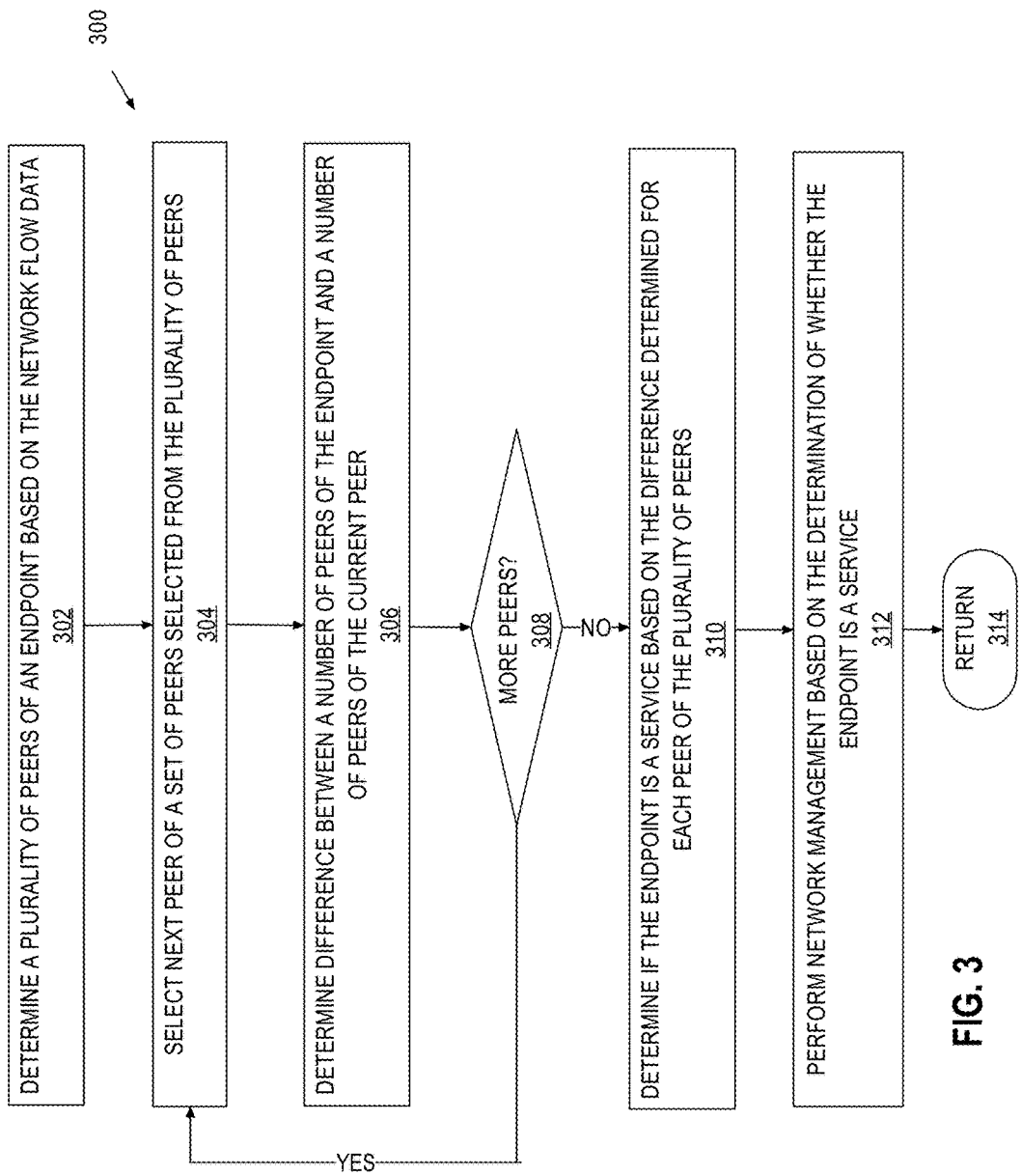
FIG. 3 illustrates an embodiment of a process for determining if an endpoint is a service.

FIG. 3 illustrates an embodiment of a process for determining if an endpoint is a service. Process 300 may be performed by one or more computing devices.

At block 302, a set of peers of an endpoint is determined based on network flow data. The set of peers includes one or more other endpoints that are observed to communicate with the unprocessed endpoint based on network flow data. In one embodiment, peers are determined by matching pairs of network flows based on source IP address values, destination IP address values, IP protocol values, source port values, and destination port values. The matching of pairs of network flows may be performed in parallel.

At block 304, the next peer of a set of peers is selected for processing. The set of peers to be processed is selected from the plurality of peers observed to communicate with the endpoint. In one embodiment, the set of peers to be processed includes all or substantially all endpoints that were determined based on the network flow data. Alternatively, one or more endpoints may be excluded from processing, such as a specifically identified endpoint, an endpoint that matches a rule, or any other endpoint otherwise identified. In one embodiment, a subset of the peers of the endpoint is selected for processing, such as a randomized selection.

At block 306, a difference is determined between a number of peers of the endpoint and a number of peers of the current peer. The number of peers of the endpoint and the number of peers of the current peer are determined based on the network flow data, which may be at least partially preprocessed. The number of peers of the current peer itself is first obtained in order to determine the difference between it and the number of peers of the endpoint. In one embodiment, the number of peers of the current peer is obtained based on network flow data, which may be at least partially pre-processed.

At decision block 308, it is determined if more peers of the endpoint remain to be processed. If it is determined that more peers remain to be processed, processing continues to block 304. Otherwise, processing continues to block 310.

At block 310, the endpoint is classified based on the set of differences determined for each peer of the plurality of peers of the endpoint. In one embodiment, the set of differences is used to determine a difference metric between the endpoint and its set of peers, such as a median peer difference. Alternatively, another difference metric may be used. In one embodiment, the endpoint is classified as a service if the median peer difference is greater than, or greater than or equal to, a threshold.

At block 312, network management is performed based on the determination of whether the endpoint is a service. For example, the status of the endpoint may be updated in a network management database or system. In one embodiment, the status of the endpoint is compared to an expected status of the endpoint to monitor whether one or more expected services are running and functioning normally. In one embodiment, the status of the endpoint is compared to an expected status of the endpoint to detect unauthorized activity on the network.

At block 314, process 300 returns and/or terminates. For example, processing may continue to processing another endpoint, passing control to a calling process, generating any appropriate record or notification, returning after a method or function invocation, or terminating.

Figure 4:
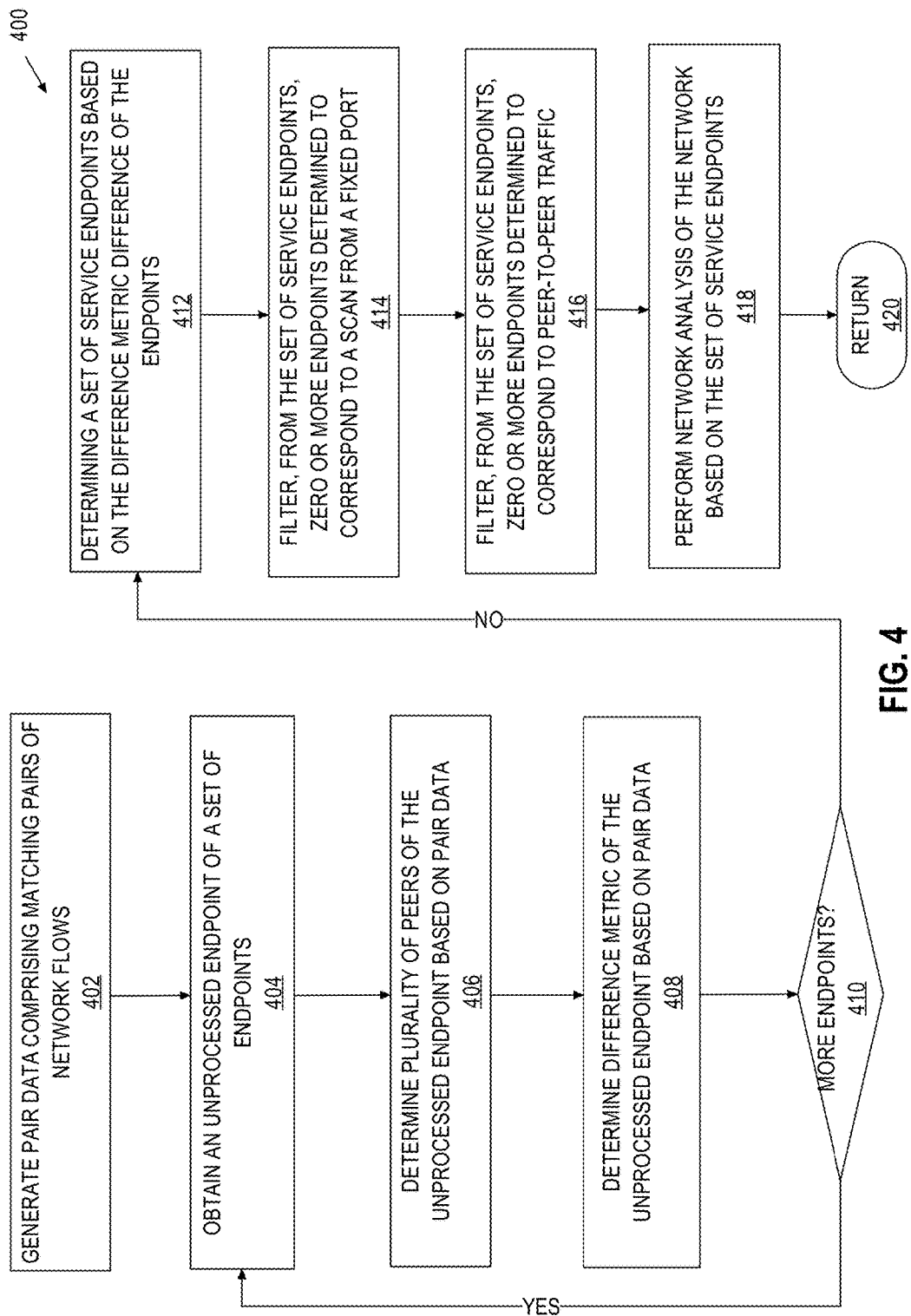
FIG. 4 illustrates an embodiment of a process for determining a set of services on a network and performing network analysis.

FIG. 4 illustrates an embodiment of a process for determining a set of services on a network and performing network analysis. Process 400 may be performed by one or more computing devices.

At block 402, pair data comprising matching pairs of network flows is generated. In one embodiment, pair data is generated by matching pairs of network flows based on network flow records in a network, such as a local area network, a subnet, or any other network. The matching pairs may be stored as pairs of network flows and/or pairs of endpoints. Network flow records may be matched based on source IP address values, destination IP address values, IP protocol values, source port values, and destination port values. In one embodiment, the matching of pairs of network flows is performed in parallel.

At block 404, an unprocessed endpoint is obtained from a set of endpoints. The set of endpoints includes at least one endpoint selected from a plurality of endpoints of the network. In one embodiment, the set of endpoints to be processed includes all or substantially all endpoints observed to communicate during a time period for which network flow data was collected. Alternatively, one or more endpoints may be excluded from processing, such as a specifically identified endpoint, and endpoint that matches a rule, or any other endpoint otherwise identified.

At block 406, a set of peers of the unprocessed endpoint is determined based on the pair data. In one embodiment, the set of peers includes one or more other endpoints that are observed to communicate with the unprocessed endpoint based on network flow data. For example, the set of peers may include one or more other endpoints that are matched to the unprocessed endpoint in the pair data.

At block 408, a difference metric of the unprocessed endpoint is determined based on the pair data. The difference metric is based on differences, for each peer of at least a subset of the set of peers, between the number of peers of the endpoint and the number of peers of each peer. In one embodiment, the difference metric is a median peer difference. A median peer difference of an endpoint is a median of differences, for each peer of the endpoint, between a number of peers of the endpoint and a number of peers of the peer.

At decision block 410, it is determined if any endpoint of the set of endpoints remain to be processed. If it is determined that one or more endpoints remain to be processed, processing continues to block 404. Otherwise, processing continues to block 412.

At block 412, a set of service endpoints are determined based on the difference metric of the endpoints in the set of endpoints. In one embodiment, a particular endpoint of the set of endpoints is classified as a service when the difference metric is greater than, or greater than or equal to, a threshold. In one embodiment, the threshold value used to classify the particular endpoint as a service is zero. In one embodiment, the difference metric is the median peer difference.

At block 414, zero or more endpoints determined to correspond to a scan from a fixed port are filtered or otherwise removed from the set of service endpoints. An endpoint may be determined to correspond to a scan from a fixed port when a large number of unsuccessful connections originate from the endpoint. In one embodiment, the threshold for the number of unsuccessful connections or the ratio of unsuccessful connections is used to determine whether the endpoint corresponds to a scan from a fixed port. In one embodiment, the number of unsuccessful connections from an endpoint initially classified as a service is determined based on the network flow data.

At block 416, zero or more endpoints determined to correspond to peer-to-peer traffic are filtered or otherwise removed from the set of service endpoints. An endpoint may be determined to correspond to peer-to-peer traffic when one or more hosts are contacted from a port greater or equal to 1024 for communication using TCP and/or UDP protocols.

At block 418, network analysis of the network is performed based on the set of service endpoints. For example, the set of service endpoints may be used to analyze, report on, or learn about network traffic, such as by recording or observing changes over time. In one embodiment, the set of service endpoints is used to monitor that one or more expected services are running and functioning normally. In one embodiment, the set of service endpoints is compared to known and/or expected services to recognize services and/or other network usage that deviate from normal network behavior. For example, the set of service endpoints may be used to detect unauthorized activity on the network.

At block 420, process 400 returns and/or terminates. For example, processing may continue to passing control to a calling process, generating any appropriate record or notification, returning after a method or function invocation, or terminating.

4. Network Detection in an Example Network

To illustrate an example of analyzing network flow data to detect network services, assume that NetFlow™ data is collected on a university subnet with about 2000 unique IP addresses. Endpoints, as defined by a unique IP-port-protocol triple of values, are identified. Pair data is generated by matching pairs of endpoints based on NetFlow records. A median peer difference is determined for each endpoint, where the median peer difference is a median of differences, for each peer, between a number of peers of the endpoint and a number of peers of each peer of the endpoint that is processed. The number of peers for an endpoint or a peer of the endpoint is determined based on the pair data.

Figure 6:
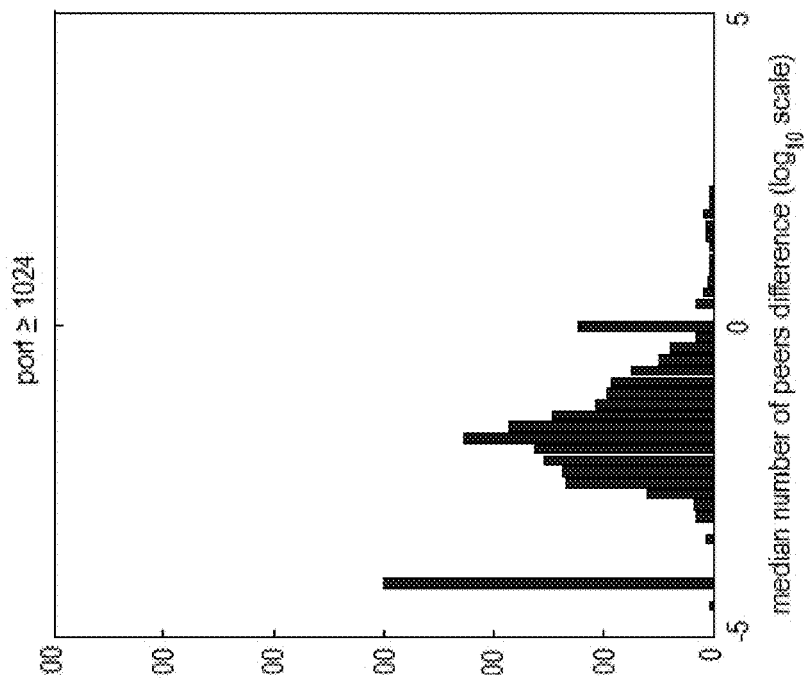
FIG. 6 illustrates data regarding a plurality of endpoints in an example network.
Figure 5:
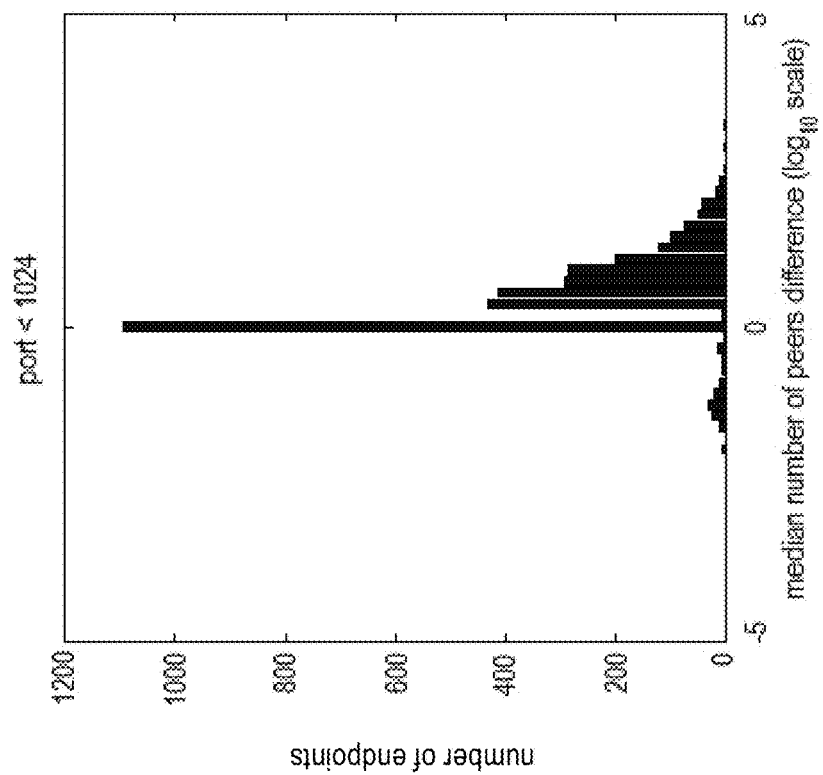
FIG. 5 illustrates data regarding a plurality of endpoints in an example network.

FIG. 5, FIG. 6 illustrate the number of endpoints over a range of median peer differences calculated for each endpoint. The median peer differences are shown on a $\log_{10}$ scale. In FIG. 5, data is shown for endpoints with a port equal to or over 1024, while in FIG. 6, data is shown for endpoints with a port below 1024. The endpoints are filtered to remove endpoints that correspond to scans from a fixed port, which are detected as endpoints with a high number of unsuccessful connections. The endpoints are further filtered endpoints that correspond to peer-to-peer traffic, which are detected as endpoints that communicate on ports greater than 1023 using TCP and/or UDP protocols.

FIG. 5, FIG. 6 illustrate the difference in detected services as compared to applying a naïve service detection rule based on port number alone. The naïve service detection rule assumes that ports below 1024 are services, while ports greater than or equal to 1024 are not services. A threshold value of 0 is used to determine whether the endpoint is a service. As seen in FIG. 5, some endpoints with a port below 1024 have a negative median peer difference, and would not be classified as a service based on the threshold value of 0. As seen in FIG. 6, some endpoints with a port greater than or equal to 1024 have a negative median peer difference, and would not be classified as a service based on the threshold value of 0. It is known that the naïve service detection rule based solely on port number is inaccurate, since some known services use a high port (8080, 3369, etc.), and some known clients use a low port (such as NTP protocol, port 123).

FIG. 7A, FIG. 7B, FIG. 7C illustrate data for a plurality of service endpoints in an example network at various intermediate stages. The graphs show the number of service endpoints over a range of median peer differences. The median peer differences are shown on a $\log_{10}$ scale. The endpoints of the same university subnet are processed as described above. A threshold median peer difference of 0. Thus, the graph does not include any endpoint with a median peer difference of less than 0 since the graph only shows endpoints classified as service endpoints.

FIG. 7A shows a set of service endpoints, as determined based on a threshold median peer difference of 0, before any peers are filtered. The set of service endpoints shown corresponds to the set of service endpoints at step 412 of process 400. At this intermediate stage, 2224 service endpoints are identified.

FIG. 7B shows the set of service endpoints after the set of service endpoints is filtered to remove endpoints that correspond to scans from a fixed port. The filtered endpoints are detected as endpoints with a high number of unsuccessful connections. The set of service endpoints shown corresponds to the set of service endpoints at step 414 of process 400. At this intermediate stage, 2210 service endpoints are identified.

FIG. 7C shows the set of service endpoints after the set of service endpoints is further filtered to also remove endpoints that correspond to peer-to-peer traffic. The filtered endpoints are detected as endpoints that communicate on ports greater than 1023 using TCP and/or UDP protocols. The set of endpoints shown corresponds to the set of service endpoints at step 416 of process 400. At this stage, 2165 service endpoints are identified. Through the two filtering steps applied, the number of false positives in the detected network services is reduced.

5. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
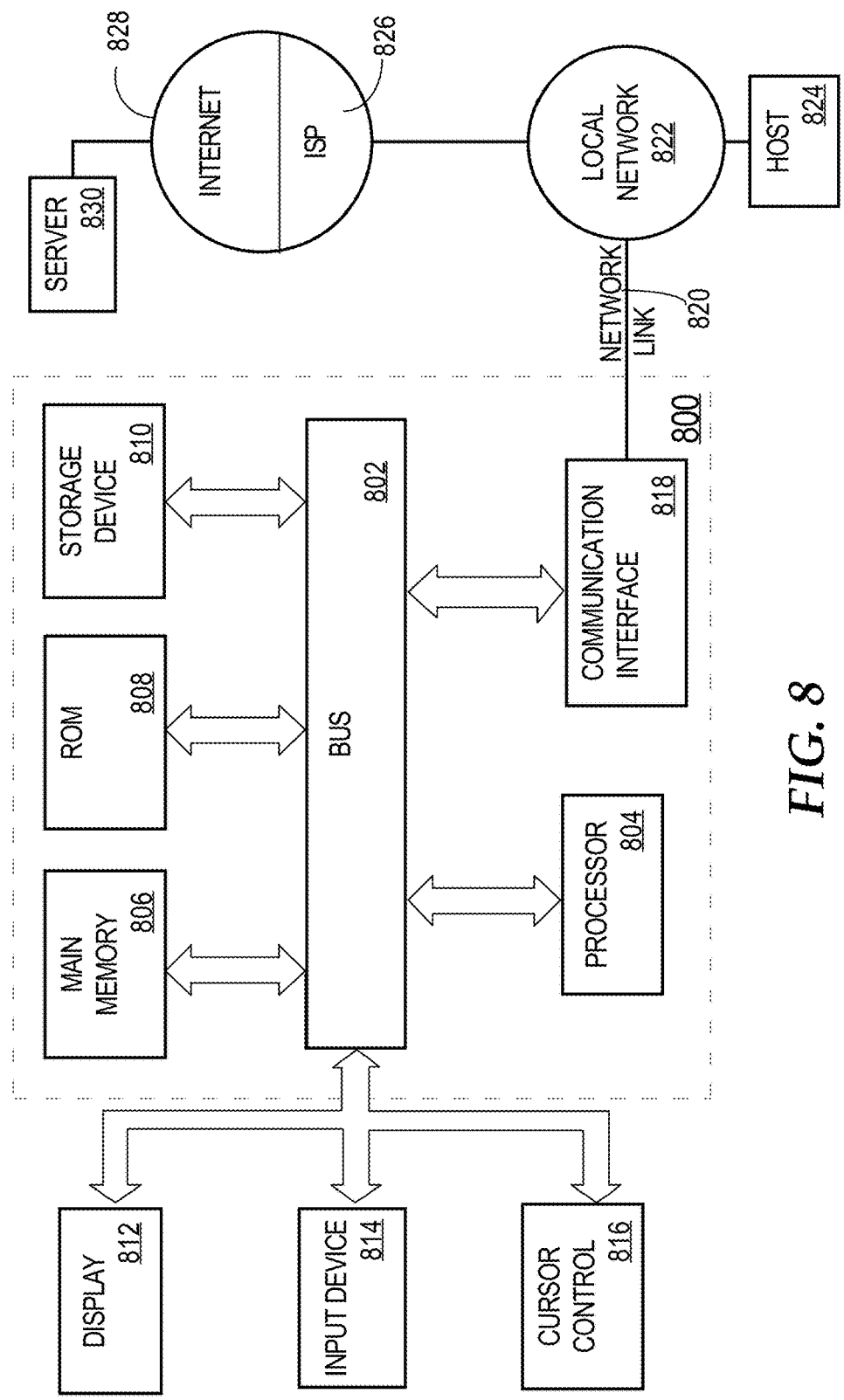
FIG. 8 illustrates a computer system with which an implementation may be used.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

6. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:

using a networking device, obtaining network flow data for a plurality of computing devices comprising a plurality of endpoints of a telecommunications network, wherein each endpoint of the plurality of endpoints is uniquely described by data comprising an IP address, a port, and a communication protocol;

for each endpoint of a set of at least one endpoint selected from the plurality of endpoints, determining a plurality of peers of the endpoint by detecting communication between the endpoint and the plurality of peers based on the network flow data;

for each peer of a set of peers selected from the plurality of peers, determining, based on the network flow data, a difference between a number of peers of the endpoint and a number of peers of said each peer;

determining a median peer difference of an endpoint, wherein the median peer difference of the endpoint is a median of differences, for each peer of the set of peers, between the number of peers of the endpoint and the number of peers of said each peer;

determining if the endpoint is a service based on the median peer difference determined for each peer of the set of peers;

performing network management based on the determination of whether the endpoint is a service.

2. The computer-implemented method of claim 1, wherein classifying the endpoint is further based on a determination that the endpoint corresponds to a scan from a fixed port, wherein the determination is based on the network flow data.

3. The computer-implemented method of claim 1, wherein classifying the endpoint is further based on a determination that the endpoint corresponds to peer-to-peer traffic, wherein the determination is based on the network flow data.

4. The computer-implemented method of claim 1, further comprising:

matching network flows described in the network flow data to generate pairs of network flows based on source IP address values, destination IP address values, IP protocol values, source port values, and destination port values.

5. The computer-implemented method of claim 4, wherein matching network flows is performed in parallel.

6. The computer-implemented method of claim 1, wherein performing network management comprises comparing the determination of whether the endpoint is a service to an expected status of the endpoint to monitor whether a service is running normally.

7. The computer-implemented method of claim 1, wherein performing network management comprises comparing the determination of whether the endpoint is a service to an expected status of the endpoint to detect unauthorized activity on the network.

8. A computer-implemented method comprising:

generating pair data for a plurality of computing devices comprising a plurality of endpoints of a network, wherein the pair data comprises matching pairs of network flows;

for each endpoint of a set of endpoints comprising at least one endpoint selected from the plurality of endpoints of the network:

determining a plurality of peers of the endpoint based on the pair data;

determining a difference metric of the endpoint based on the pair data, wherein the difference metric is based on differences, for each peer of at least a subset of the plurality of peers, between a number of peers of the endpoint and a number of peers of each peer, wherein the difference metric is a median peer difference;

determining a set of service endpoints based on the difference metric of each endpoint in the set of endpoints;

filtering, from the set of service endpoints, zero or more endpoints determined to correspond to a scan from a fixed port;

filtering, from the set of service endpoints, zero or more endpoints determined to correspond to peer-to-peer traffic;

performing network analysis of the network based on the set of service endpoints.

9. The computer-implemented method of claim 8, wherein the network analysis comprises determining that one or more expected services are running and functioning normally.

10. The computer-implemented method of claim 8, wherein the network analysis comprises detecting unauthorized activity on the network.

11. A data processing apparatus comprising:

one or more processors;

one or more interfaces that are configured to couple to a communications network;

one or more non-transitory computer-readable storage media storing one or more sequences of instructions which, when executed by the one or more processors, cause the one or more processors to perform:

obtaining network flow data for a plurality of computing devices comprising a plurality of endpoints of a telecommunications network, wherein each endpoint of the plurality of endpoints is uniquely described by data comprising an IP address, a port, and a communication protocol;

for each endpoint of a set of at least one endpoint selected from the plurality of endpoints, determining a plurality of peers of the endpoint by detecting communication between the endpoint and the plurality of peers based on the network flow data;

for each peer of a set of peers selected from the plurality of peers, determining, based on the network flow data, a difference between a number of peers of the endpoint and a number of peers of said each peer;

determining a median peer difference of an endpoint, wherein the median peer difference of the endpoint is a median of differences, for each peer of the set of peers, between the number of peers of the endpoint and the number of peers of said each peer;

determining if the endpoint is a service based on the median peer difference determined for each peer of the set of peers;

performing network management based on the determination of whether the endpoint is a service.

12. The data processing apparatus of claim 11, wherein classifying the endpoint is further based on a determination that the endpoint corresponds to a scan from a fixed port, wherein the determination is based on the network flow data.

13. The data processing apparatus of claim 11, wherein classifying the endpoint is further based on a determination that the endpoint corresponds to peer-to-peer traffic, wherein the determination is based on the network flow data.

14. The data processing apparatus of claim 11, wherein the one or more sequences of instructions, when executed by the one or more processors, further cause the one or more processors to perform matching network flows described in the network flow data to generate pairs of network flows based on source IP address values, destination IP address values, IP protocol values, source port values, and destination port values.

15. The data processing apparatus of claim 14, wherein matching network flows is performed in parallel.

16. The data processing apparatus of claim 11, wherein performing network management comprises comparing the determination of whether the endpoint is a service to an expected status of the endpoint to monitor whether a service is running normally.

17. The data processing apparatus of claim 11, wherein performing network management comprises comparing the determination of whether the endpoint is a service to an expected status of the endpoint to detect unauthorized activity on the network.

* * * * *